United States Patent [19]

Hrovat et al.

[11] Patent Number: 5,520,146

[45] Date of Patent: May 28, 1996

[54] ELECTRONIC CONTROL SYSTEM FOR SINGLE AND SERIES THROTTLE VALVES

[75] Inventors: Davorin Hrovat, Dearborn; Michael Fodor, Taylor; Minh N. Tran, Dearborn, all of Mich.

[73] Assignee: Ford Motor Company, Dearborn, Mich.

[21] Appl. No.: 398,339

[22] Filed: Mar. 3, 1995

[51] Int. Cl.[6] .................................................. F02D 9/02
[52] U.S. Cl. ............................................. 123/336; 123/442
[58] Field of Search ................................. 123/336, 399, 123/442; 180/197

[56] References Cited

U.S. PATENT DOCUMENTS

| | | | |
|---|---|---|---|
| 4,484,551 | 11/1984 | Choma et al. | 123/442 X |
| 4,637,487 | 1/1987 | Nakamura et al. | 180/197 |
| 4,722,411 | 2/1988 | Ohashi et al. | 123/336 X |
| 4,982,710 | 1/1991 | Ohta et al. | 123/399 |
| 4,995,364 | 2/1991 | Kamei et al. | 123/442 |
| 5,105,360 | 4/1992 | Akiyama | 364/426.03 |
| 5,124,922 | 6/1992 | Akiyama | 364/426.02 |
| 5,220,828 | 6/1993 | Sodeno et al. | 73/118.1 |
| 5,431,139 | 7/1995 | Grutter et al. | 123/399 X |

FOREIGN PATENT DOCUMENTS 60-128943  7/1985  Japan ................................. 123/336

*Primary Examiner*—Tony M. Argenbright
*Attorney, Agent, or Firm*—Allan J. Lippa; Roger L. May

[57] ABSTRACT

An electronic controller for automatically adjusting the position of a throttle valve in either a single valve or a series valve throttle mechanism. A primary controller (20) produces an output signal (18) suitable for directly operating the single throttle valve in a "drive by wire" throttle system. When used to position a valve (32) in a two-valve series throttle system, the other valve (34) being directly controlled by the accelerator pedal, a signal translation unit (30) is employed to modify the output signal (18) from the primary controller in response to the current setting of the accelerator-controlled valve (34) and values indicating the current air flow rate ($Q_1$) and the intake manifold pressure ($P_m$). The primary controller (20) and the signal translation unit are implemented using a conventional electronic engine control processor, with the signal translation being performed by table lookup operations (51–54).

10 Claims, 2 Drawing Sheets

ELECTRONIC CONTROL SYSTEM FOR SINGLE AND SERIES THROTTLE VALVES

FIELD OF THE INVENTION

This invention relates to methods and apparatus for electronically controlling the flow of intake air to an internal combustion engine.

BACKGROUND OF THE INVENTION

Electronically controlled engine throttles typically employ one or two adjustable throttle plates positioned in the intake air stream to control the rate at which air flows into the engine for combustion. In a single valve system, the position of a single throttle plate is varied by an electronic control signal in response to sensor signals which indicate accelerator position and other engine operating conditions. In a series valve system, two throttle plates act together to control the quantity of air flowing to the engine, the first plate being directly controlled by the driver's movement of the accelerator pedal while the second plate is moved automatically in response to other engine conditions. Both the single and series valve systems may be adapted to provide special capabilities, such as cruise control or electronic traction control.

Single and series valve systems require electronic controllers which function differently. A controller for a single valve system must provide an output signal which is responsive to both accelerator position and sensed operating conditions, whereas the controller for a series valve system generates a signal for driving the second of two throttle plates to make further adjustment, when appropriate, to the flow rate established by the first throttle plate which is operated directly by accelerator pedal movements. The design, configuration and tuning of these two controller types is consequently quite different and the design specifications developed for one type are of little use in the development of the second type.

SUMMARY OF THE INVENTION

It is accordingly an object of the present invention to electronically control both single and series throttle mechanisms by means of a modular control system incorporating a common control module which is capable of directly operating a single valve throttle mechanism and which, when used with an additional signal translation module, is also capable of controlling a series throttle mechanism.

In a principal aspect, the present invention takes the form of an electronically controlled throttle system consisting of a moveable accelerator pedal positioned by the vehicle operator to vary the rate at which intake air is supplied to the engine, means for generating a first condition signal which indicates the current position of the accelerator pedal, means for generating one or more additional condition signals indicating other engine and vehicle operating conditions, a primary control module for generating a first output control signal value in response to the condition signals, the first output control value being indicative of the flow rate of the air to be supplied to the engine, and a signal translation unit responsive to at least the first condition signal for converting the first output control value into a second output control value for setting the position of one of the throttle valves in a series valve mechanism. The second output control value adjusts the series valve throttle to provide the same air flow that would have been produced by a single valve system in response to the first output control value produced by the primary control module.

The present invention is preferably implemented by means of the same electronic engine control module used for other functions, such as fuel delivery rate control. The signal translation unit preferably makes use of a plurality of lookup tables for storing predetermined values at addressable locations in a non-volatile memory. One lookup table is used to convert the combination of (1) a value indicating the intake air flow rate and (2) a value indicating the position of the series throttle plate which is controlled by the accelerator pedal into a first quantity representing the pressure between the two valves of the series valve mechanism. A further table is then used to convert the combination of this first quantity and a value representing the downstream intake manifold pressure into the second output control value used to adjust the position of the second throttle plate to achieve the desired flow rate.

These and other object, features and advantages of the present invention will be made more apparent by a consideration of the following detailed description. During the course of this description, frequent reference will be made to the accompanying drawings.

DESCRIPTION OF THE PREFERRED EMBODIMENT

Figure 1:
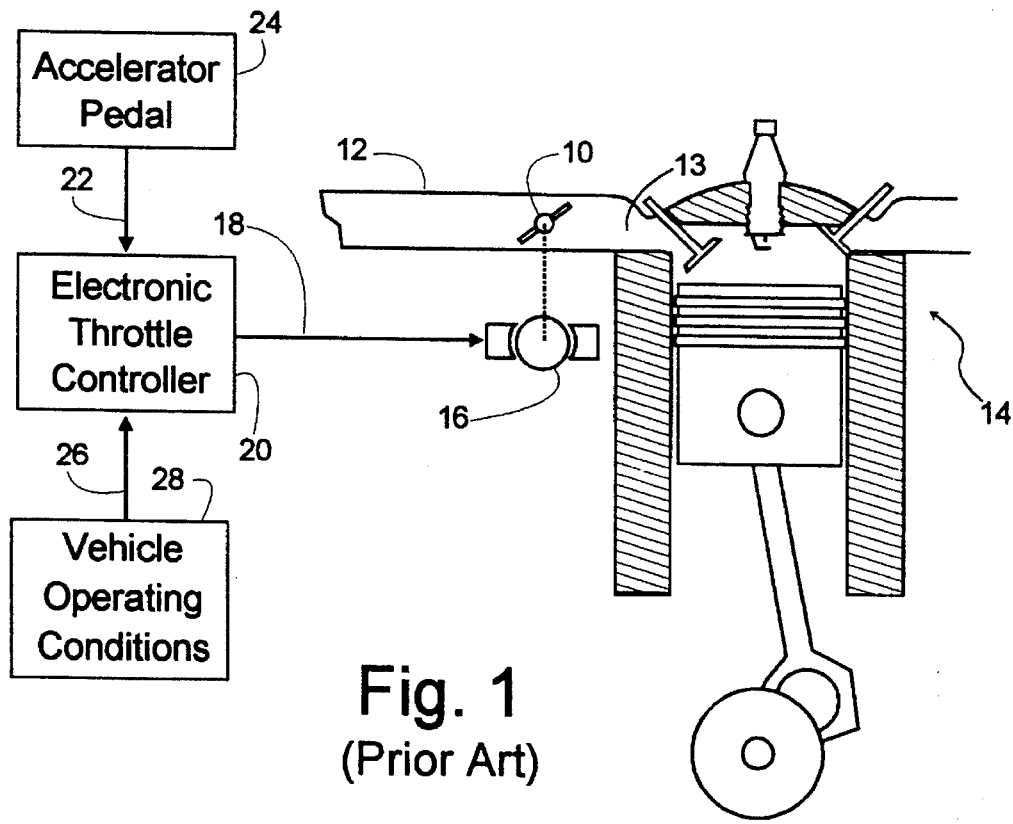
FIG. 1 is a block schematic diagram of a single valve electronic throttle control system commonly used to control the quantity of intake air flowing to an internal combustion engine.

FIG. 1 of the drawings depicts a conventional, electronically controlled, single valve throttle mechanism. A single throttle valve 10 is positioned in the intake air supply 12 to control the flow of air to the intake manifold 13 of an internal combustion engine indicated generally at 14. The throttle valve 10 is positioned by a drive means 16 in response to an output control signal 18 produced by an electronic single valve controller 20. The controller 20 varies the output signal 18 in response to a first input signal 22 having a value which indicates of the current position of an accelerator pedal 24 manipulated by the vehicle driver. Controller 20 also responds to one or more additional input signals 26 which specify other vehicle operating conditions, as indicated at 28 in FIG. 1, such as the loss of drive wheel traction or a departure from a desired speed established for cruise control. In the electronically controlled single valve system shown in FIG. 1, sometimes termed a "drive-by-wire" system, the output signal 18 produced by controller 20 specifies a desired flow rate for the air to be supplied to the engine, the value of signal 18 being based on both the accelerator pedal position and other sensed operating conditions.

Figure 2:
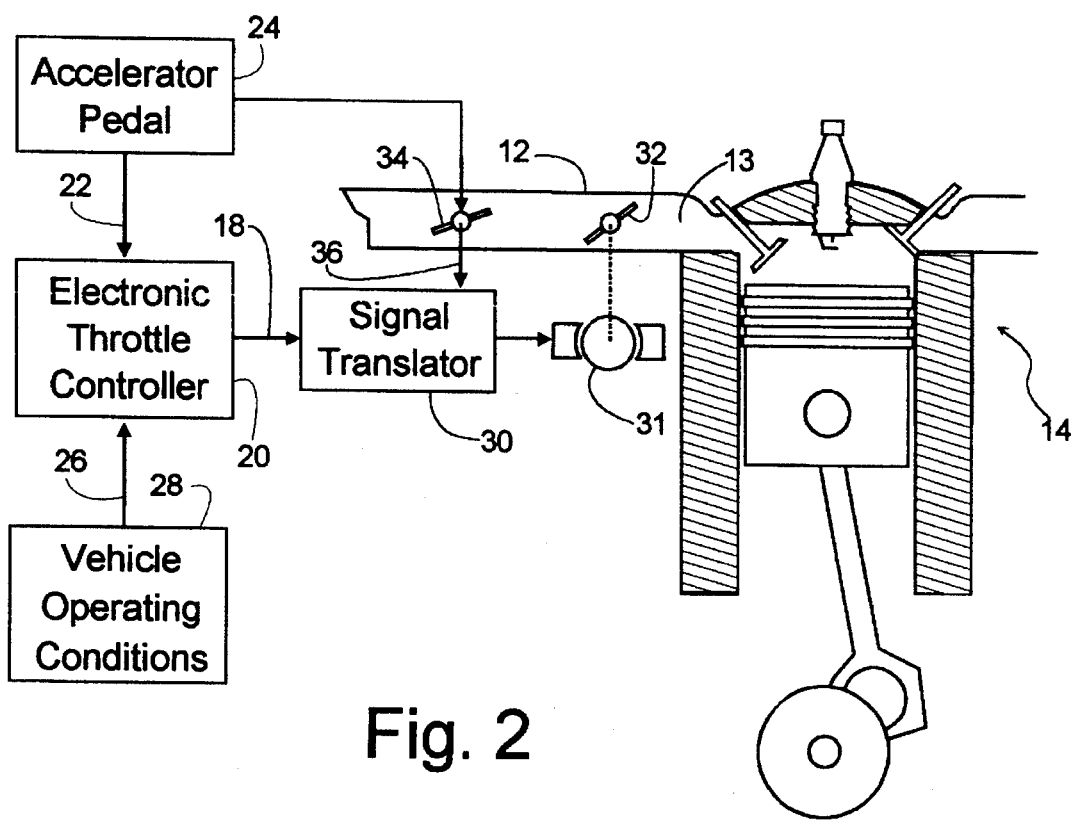
FIG. 2 is a block schematic diagram of a modular series valve electronic throttle control system which embodies the principles of the invention.

As illustrated in FIG. 2, the present invention utilizes the same electronic throttle control module 20 used to operate a single valve throttle mechanism as seen in FIG. 1. The output signal 18 from module 20 is modified to control a series valve mechanism by means of a signal translator seen at 30. The series valve mechanism consists of a first throttle valve 32 which cooperates with a second, independently controlled throttle valve 34. The signal translator 30 modifies the output signal 18 by an amount dependent upon the current position of the second valve 34 which is independently controlled, typically in direct response to movements of the accelerator pedal 24 as illustrated in FIG. 2.

By using the signal translation scheme depicted in FIG. 2, it is possible to use a single valve controller module 20 to operate either a single valve or a series valve mechanism. Significant savings can be obtained by using a single control module which contains most of the complex controller functionality needed by both systems. The initial controller design process, as well as the adaptation of the design to specific vehicle configurations and options, can thus be shared by both systems, substantially reducing system development costs. Particularly complex electronic throttle control mechanisms, such as automatic traction control system and the like, can be incorporated into the sharable single valve controller module and used without modification to control series valve throttle mechanisms as well. The principles of the invention permit a single throttle control to be used in a wide variety of vehicles, with the optional additional processing required for a series throttle mechanism being enabled and configured at the same time other electronic engine control parameters are specified for other engine control functions.

Figure 3:
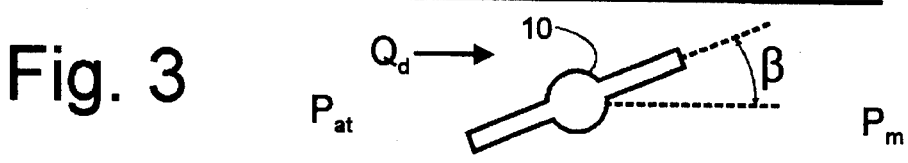
FIG. 3 illustrates the quantitative variables used to describe the operation of a single valve mechanism of the type shown in FIG. 1.
Figure 4:
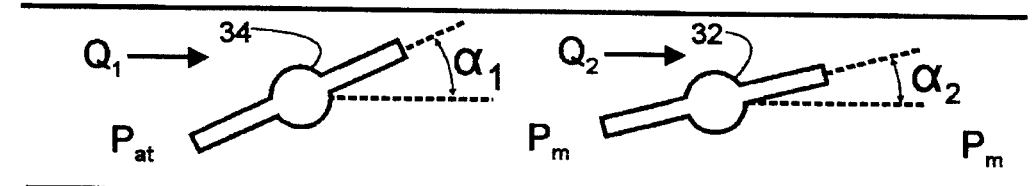
FIG. 4 depicts the quantitative variables which describe the operation of a series valve mechanism of the type shown in FIG. 2.

FIGS. 3 and 4 of the drawings illustrate the quantitative variables which are used in the signal translation unit 30 contemplated by the invention. FIG. 3 shows the single throttle valve 10 of FIG. 1 positioned at an angle $\beta$ in an intake passage. The mass air flow rate through the passage is specified by the variable $Q_d$, the atmospheric pressure upstream from the valve 10 is represented by the variable $P_{at}$, and the pressure at the intake manifold, downstream from the valve 10, is represented by the variable $P_m$.

FIG. 4 shows the variables used to represent the state of the series valve system of FIG. 2. The position of a first valve 34 is represented by the angle $\alpha_1$, typically established by the accelerator pedal as illustrated at 24 in FIG. 2. The position of the second valve 32 is represented by the angle $\alpha_2$ and is set by the drive means 31 in response to the output signal value produced by the signal translator 30 as seen in FIG. 2. The angle $\alpha_2$ of the valve 34 is adjusted to produce a desired mass air flow quantity $Q_2$. The pressure upstream of valve 34 is represented by the variable $P_{at}$, the pressure between the valves 32 and 34 is specified by the variable $P_i$, and the pressure downstream of valve 32 at the intake manifold is represented by the variable $P_m$.

The signal translator 20 seen in FIG. 2 controls the valve 32 to provide the same net air flow to the intake manifold that would have been established by a single valve controller. The signal translation process is performed by the unit 30 by sequentially analyzing the, performance of each series valve separately and by analyzing the performance of a hypothetical single valve system in response to the output signal 18. Each analysis make use of an approximate relationship between mass air flow, the cross-sectional area of the opening presented by each throttle plate (valve), and the pressure immediately upstream and downstream from the valves. For the valve 34 in FIG. 2, that relationship takes the form of an equation whose variables, as depicted in FIG. 4, comprise: the mass air flow $Q_1$ over the valve 34, the atmospheric pressure $P_{at}$ upstream of the valve 34 and the internal pressure $P_i$ immediately downstream between the valve 34 and the valve 32. The relationship which models the operation of valve 34 may be expressed as follows:

$$Q_1 = C_1 A_1 \Phi_1 \sqrt{0.447 \rho_{at} (P_{at} - P_i)} \tag{1}$$

where $$\Phi_1 = \approx 0.61 \frac{P_i}{P_{at}} + 0.39 \ldots \text{for} \frac{P_i}{P_{at}} \geq 0.528 \tag{2}$$

and where $\rho_{at}$ is density of atmospheric air, $C_1$ is the flow coefficient whose value varies with throttle plate angle, and $A_1$ is the effective cross-sectional area of the opening surrounding valve 34, a quantity proportional to $(1-\sin(\alpha_1))$ which may be readily calculated from the dimensions of the valve plate 34.

Knowing the mass air flow rate $Q_1$ and the angle $\alpha_1$ of the valve 34, equations (1) and (2) above can be used to determine the intermediate pressure $P_i$. The mass air flow rate $Q_1$ may be measured in known ways and is typically available as a digital expressed value in a predetermined memory location maintained by the fuel control processes performed in electronic engine control (EEC) systems.

Having determined $P_i$, a similar equation may be used to model the contribution of the valve 32, where the total mass air flow over valve 32 is $Q_2$ (the same flow rate as $Q_1$, the flow rate over valve 34), with $P_i$ being used as the upstream pressure for valve 32 and $P_m$ being the downstream pressure at the engine's intake manifold:

$$Q_2 = C_2 A_2 \Phi_2 \sqrt{0.447 \rho_i (P_i - P_m)} \tag{3}$$

where $$\Phi_2 = 0.61 \frac{P_m}{P_i} + 0.39 \ldots \text{for} \frac{P_m}{P_i} \geq 0.528 \tag{4}$$

In order to use equations (3) and (4) to determine $A_2$ (and the desired angle $\alpha_2$ at which valve 32 should be set), it is necessary to first determine the manifold pressure, $P_m$, that would exist at the intake manifold when a measured air flow rate $Q_d$ flows over a hypothetical single valve 10 as illustrated in FIGS. 1 and 3. It is first assumed that the hypothetical single valve would be set to a position angle $\beta$ by the current value of the output positioning signal 18 from the single valve controller module 20. Knowing $P_{at}$ and the measured flow rate $Q_d=Q_1$, the same relationship is used to model the behavior of the hypothetical single valve 10 seen in FIGS. 1 and 3 in response to the output signal 18, where the total mass air flow over the hypothetical single valve is $Q_d$, where $P_{at}$ is the atmospheric pressure upstream of the single valve, and where $P_m$ is the downstream pressure which would exist at the engine's intake manifold:

$$Q_d = C_3 B \Phi_s \sqrt{0.447 \rho_i (P_{at} - P_m)} \tag{5}$$

where $$\Phi_s = \approx 0.61 \frac{P_m}{P_{at}} + 0.39 \ldots \text{for} \frac{P_m}{P_{at}} \geq 0.528 \tag{6}$$

Using the value of $P_m$ calculated from equations (5) and (6) based on the single valve controller output 18, equations (3) and (4) can then be used to calculate the desired angle $\alpha_2$ to which valve 32 should be set to achieve the same mass flow rate.

While the foregoing relations could be used to calculate the position $\alpha_2$, in practice the desired signal translation can be more efficiently accomplished by storing predetermined control signal values in lookup tables. The following procedure, shown diagramatically in FIG. 5, illustrates one practical implementation of the principles of the invention.

First, the air mass flow rate, which is the same for both series valves and the hypothetical single valve (e.g., $Q_1=Q_2=Q_d$), is determined at predetermined sampling instants as part of a recalculation performed at regular intervals during each engine cycle. Recalculation is preferably performed once every ten milliseconds. The measured flow rate $Q_d$ specified by each sample is used in combination with the current value of the signal 18 produced by the conventional "drive by wire" controller module 20 for controlling a single valve throttle positioning mechanism 16 as indicated in FIG. 1. It should be noted that the value of signal 18 produced by the single valve controller 20 is determined in response to both the position of the accelerator pedal 24 and other vehicle operating conditions 28.

Figure 5:
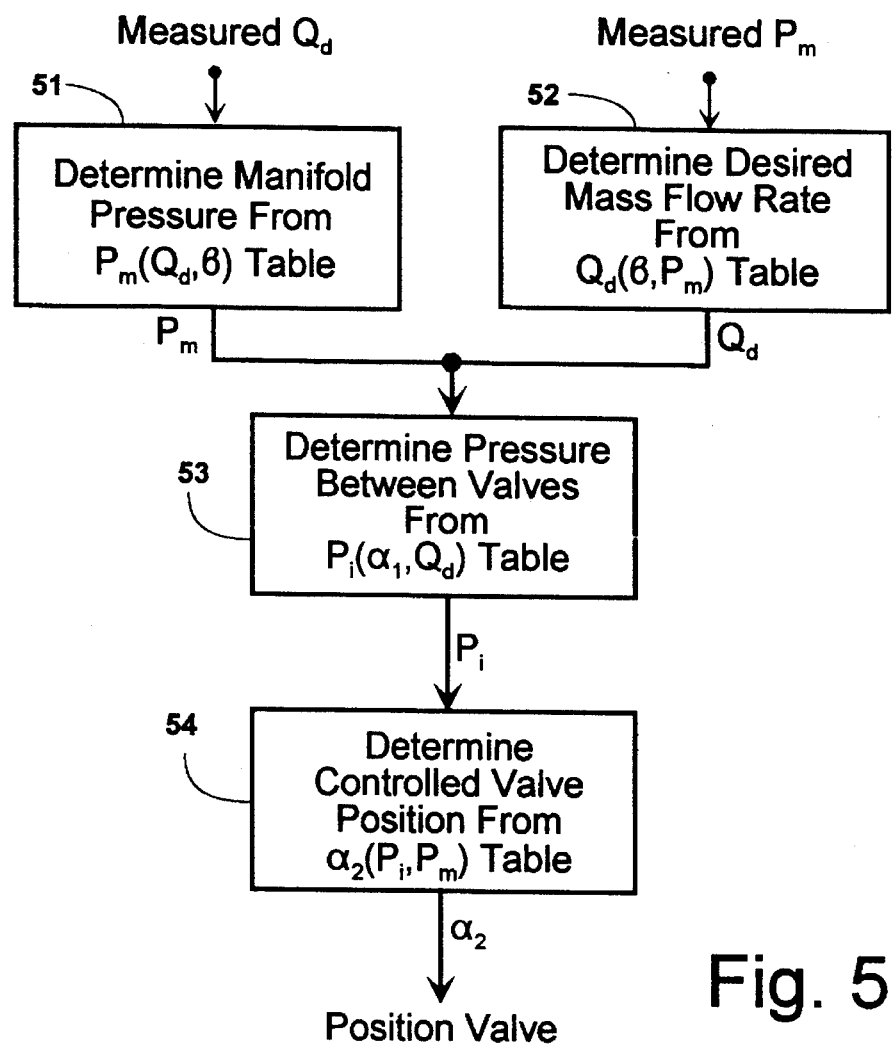
FIG. 5 is a flowchart illustrating the processing steps used to translate the output from a single valve control module into a modified value adapted to control one of the valves in a series valve throttle mechanism.

Using the value of the controller output signal 18 as indicating the setting angle $\beta$ of a hypothetical single valve throttle, the value $P_m$ reflecting the current manifold pressure may be retrieved from a first lookup table as indicate at step 51 in FIG. 5. Note that, in the alternative illustrated by the step 52 in FIG. 5, the manifold pressure $P_m$ is measured instead of the flow rate $Q_d$, and a lookup table similarly based on equations (5) and (6) may be used to determine the flow rate $Q_d$ given the value of signal 18 and the measured value $P_m$. Either way, prior to performing the processing steps 53 and 54, both the air flow rate and the intake manifold pressure $P_m$ are established.

Next, as illustrated at step 53 in FIG. 5, the intermediate pressure $P_i$ between the valves 32 and 34 is determined using a lookup table indexed by the values of $Q_d$ and the current angle $\alpha_1$ at which the independently positioned valve 32 is set.

Finally, using the combination of the intermediate pressure value $P_i$ and the previously obtained value of manifold pressure $P_m$, a further lookup table is employed at step 54 to obtain the value of the desired setting angle $\alpha_2$ of the valve 32.

The signal processing steps illustrated in the flowchart of FIG. 1 are preferably performed by the same electronic engine control processor used to perform the single valve control processing at 20, which may conveniently be the same electronic engine control processor used for determining the fuel delivery rate. The lookup tables which for storing the relations $P_m(Q_d, \beta)$, $Q_d(\beta,P_m)$, $P(\alpha_1,Q_d)$ and $\alpha_2(P_i,P_m)$ used at steps 51–54 respectively in FIG. 5 are preferably stored in a non-volatile read-only memory, with values preloaded prior to delivery of the vehicle and tailored to particular engine and vehicle configuration.

It is to be understood that the embodiment of the invention which has been described is merely illustrative of one application of the principles of the invention. Numerous modifications may be made by those skilled in the art without departing from the true spirit and scope of the invention.

What is claimed is:

1. An electronically controlled throttle system for use with an internal combustion engine having an air intake manifold, said system comprising, in combination, an moveable accelerator pedal for varying the rate at which intake air is delivered to said intake manifold, a source of a first input signal value indicating the current position of said accelerator pedal, means responsive to said first input signal value for generating a first output control signal value indicative of a desired rate of air flow to said engine, a throttle mechanism including first and a second valves arranged in series between an air intake port and the intake manifold of said engine, the setting of said first and second valves being independently adjustable to vary the rate of air flow to said engine, sensing means for indicating the current setting of said first valve, signal translating means responsive to said first control signal value and said sensing means for producing a second output control signal value, and means responsive to said second output control signal value for adjusting the position of said second valve whereby said first and second valves in combination provide said desired rate of air flow to said engine.

2. An electronically controlled throttle system as set forth in claim 1 wherein the setting of said first valve is adjusted in direct response to movements of said accelerator pedal.

3. An electronically controlled throttle system as set forth in claim 1 wherein said signal translating means comprises, in combination, means responsive to said first output control signal value for producing a first quantity indicative of the current air flow rate to said intake manifold and a second quantity indicative of the air pressure at said intake manifold, means responsive to said sensing means and said first quantity for producing a third quantity indicative of the pressure between said first and second valves, and means responsive to said second and third quantities for producing said second output control signal value.

4. An electronically controlled throttle system as set forth in claim 3 wherein said means for producing said first quantity comprises memory means for storing a set of predetermined values at addressable storage locations uniquely specified by the combination of said first control signal value and said second quantity.

5. An electronically controlled throttle system as set forth in claim 3 wherein said means for producing said third quantity comprises memory means for storing a set of predetermined values at addressable storage locations uniquely specified by the combination of said first quantity and the value of a signal produced by said sensing means.

6. An electronically controlled throttle system as set forth in claim 5 wherein said means for producing said third second output signal comprises memory means for storing a set of predetermined values at addressable storage locations uniquely specified by the combination of said second and third quantities.

7. An intake air control system as set forth in claim 6 wherein said signal translating means comprises, in combination, means responsive to said first output control signal for producing a first quantity indicative of the current mass air flow rate to said engine and a second quantity indicative of the air pressure at said intake manifold downstream from said first and second valves, means responsive to said accelerator position signal and said first quantity for producing a third quantity indicative of the pressure between said first and second valves, and means responsive to said second and third quantities for producing said second output control signal value.

8. An electronically controlled throttle system as set forth in claim 7 wherein said means for producing said first quantity comprises memory means for storing a set of predetermined values at storage locations specified by the combination of said first control signal value and said second quantity.

9. An electronically controlled throttle system as set forth in claim 8 wherein said means for producing said third quantity comprises memory means for storing a set of predetermined values at storage locations specified by the combination of said first quantity and the value of a signal produced by said sensing means.

10. An electronic intake air control system for use with a vehicle powered by an internal combustion engine, said engine being provided with an air intake manifold and a series throttle mechanism comprising first and second throttle valves positioned in series in an intake air flow passage between an air intake port and said intake manifold, and a moveable accelerator pedal positioned by a vehicle operator to control the rate of air flow to said intake manifold, said control system comprising, in combination, first sensing means for producing an accelerator pedal position signal value indicative of the current position of said pedal, second sensing means for producing a vehicle condition signal indicative of at least one vehicle operating condition, an electronic throttle controller connected to said first and said second sensing means for producing a first output control signal in response to said accelerator position signal and said vehicle condition signal, said first output control signal having a magnitude indicative of a desired rate of air flow to said engine manifold, a signal translation unit connected to said throttle controller and to said first sensing means for generating a second output control signal, and drive means responsive to the position of said accelerator pedal for varying the position of said first valve, and drive means responsive to said second output control signal for varying the position of said second valve.

* * * * *